United States Patent [19]
Hattori et al.

[11] Patent Number: 5,172,362
[45] Date of Patent: Dec. 15, 1992

[54] RECORDING MEDIUM LOADING MECHANISM

[75] Inventors: Toshiyasu Hattori, Minamiashigara; Tokuya Kaneda, Odawara; Masateru Watanabe, Chigasaki, all of Japan

[73] Assignee: Hirachi, Ltd., Tokyo, Japan

[21] Appl. No.: 823,011

[22] Filed: Jan. 15, 1992

Related U.S. Application Data

[63] Continuation of Ser. No. 193,675, May 13, 1988, abandoned.

[30] Foreign Application Priority Data

May 15, 1987 [JP] Japan .................... 62-117134

[51] Int. Cl.⁵ .................. G11B 17/00; G11B 17/035; G11B 17/04
[52] U.S. Cl. ............... 369/77.2; 369/77.1; 360/99.03; 360/99.06
[58] Field of Search ............ 369/77.02, 75.1, 75.2, 369/77.1; 360/99.02, 99.03, 99.06, 99.07

[56] References Cited
U.S. PATENT DOCUMENTS

| | | | |
|---|---|---|---|
| 3,545,767 | 12/1970 | Tourtellot | 369/206 |
| 4,426,695 | 1/1984 | Moriki et al. | 369/77.2 |
| 4,710,831 | 12/1987 | Nishimura | 369/77.2 |
| 4,730,296 | 3/1988 | Urata et al. | 369/77.2 X |
| 4,794,481 | 12/1988 | Suyama et al. | 369/77.2 |
| 4,815,065 | 3/1989 | Rouws | 369/77.2 |

FOREIGN PATENT DOCUMENTS 6190052 11/1984 Japan .
60146951 11/1984 Japan .

*Primary Examiner*—Stuart S. Levy
*Assistant Examiner*—Joseph A. Rhoa
*Attorney, Agent, or Firm*—Fay, Sharpe, Beall, Fagan, Minnich & McKee

[57] ABSTRACT

A recording medium loading mechanism for use in a signal processing apparatus has a motor which operates uni-directionally, and a power transmission mechanism operative to convert the rotation of the motor output shaft into reciprocating movements of a recording medium carrier between a loading position and a recording-reproducing position. The power transmission mechanism includes a crank pin (18) connected to the motor output shaft, a lost-motion connection for converting the rotational motion of the motor output shaft into reciprocal movements to move a reciprocating member (19), and cams cooperative with cam followers to transmit the reciprocating movements to the recording medium carrier.

15 Claims, 3 Drawing Sheets

RECORDING MEDIUM LOADING MECHANISM

This application is a continuation of application Ser. No. 07/193,675 filed May 13, 1988 now abandoned.

BACKGROUND OF THE INVENTION

The present invention relates to a disk-type signal processing apparatus which makes use of a disk-type recording medium such as a video disk, audio disk, optical disk and so forth. More particularly, the present invention is concerned with a recording medium loading mechanism for use in the disk-type signal processing apparatus of the type mentioned above, which is improved to simplify the mechanism of the apparatus and the electric circuit thereof.

Automatic loading devices for loading a recording medium, such as a disk cartridge, in a signal processing apparatus have been known from Japanese Utility Model Unexamined Publication Nos. 61-90052 and 60-146951. In general, the known loading device includes a cartridge holder portion, a driving motor with gears, and a driving power transmission. In particular, the driving power transmission includes a lot of component parts such as a link mechanism, a gear train, a power transmission shaft and so forth. The loading and unloading operation for loading and unloading the disk cartridge on and from the signal processing apparatus is effected by controlling the driving motor in forward and backward directions. Therefore, the driving circuit for the driving motor is required to have a protection circuit for checking the reverse current which is produced when the direction of the driving electric current is changed to reverse the driving motor. Furthermore, the mechanism sections which operate during the loading and unloading operations are made from materials having a high degree of reliability for longer operation, because only limited elements of these sections, such as the motor and gears, are actually used repeatedly.

As pointed out above, the known loading device has a driving power transmission having a larger number of component parts. This requires a complicated driving circuit for the driving motor as well as mechanical parts that have to be made from highly reliable materials. Satisfying these requirements runs contrary to the demands for reduction in the cost and size and for improvement in the reliability of disk players.

SUMMARY OF THE INVENTION

Accordingly, it is an object of the present invention to provide a recording medium loading mechanism of a structure which contributes to simplification of the mechanical and electrical systems of an associated signal processing apparatus and, thus, to reduce the number of the component parts and the cost of manufacture while improving the reliability of operation, thereby overcoming the prior art problems pointed out above.

According to one feature of the invention, there is provided a recording medium loading mechanism intended for use in a signal processing apparatus having a housing with an opening serving as an entrance and exist for a recording medium. The mechanism comprises a recording medium carrier mounted in the housing for movement between a first position for loading a recording medium into the carrier adjacent to the opening and a second position for at least one of recording and reproduction on the recording medium that is spaced from the opening. A uni-directionally operative motor is secured to the housing. The rotation of the output shaft of the motor is converted into reciprocal movements so that the carrier is moved between the first and second positions.

According to another feature of the invention, there is provided a loading mechanism for a cartridge accommodating a recording medium. The mechanism comprises a carrier with an opening for insertion of the cartridge. The carrier is drivingly connected to a movable member reciprocally movable in a plane substantially parallel to the direction in which the cartridge is inserted into and removed out of the carrier. The reciprocally movable member is driven by a uni-directionally operative motor. When the movable member is moved in a direction, the carrier is moved between a first position for insertion and removal of the cartridge into and out of the carrier and a second position for at least one of recording and reproduction on the recording medium in the cartridge.

The above and other objects, features and advantages of the present invention will be made more apparent by the following description with reference to the accompanying drawings.

DESCRIPTION OF THE PREFERRED EMBODIMENTS

Figure 1:
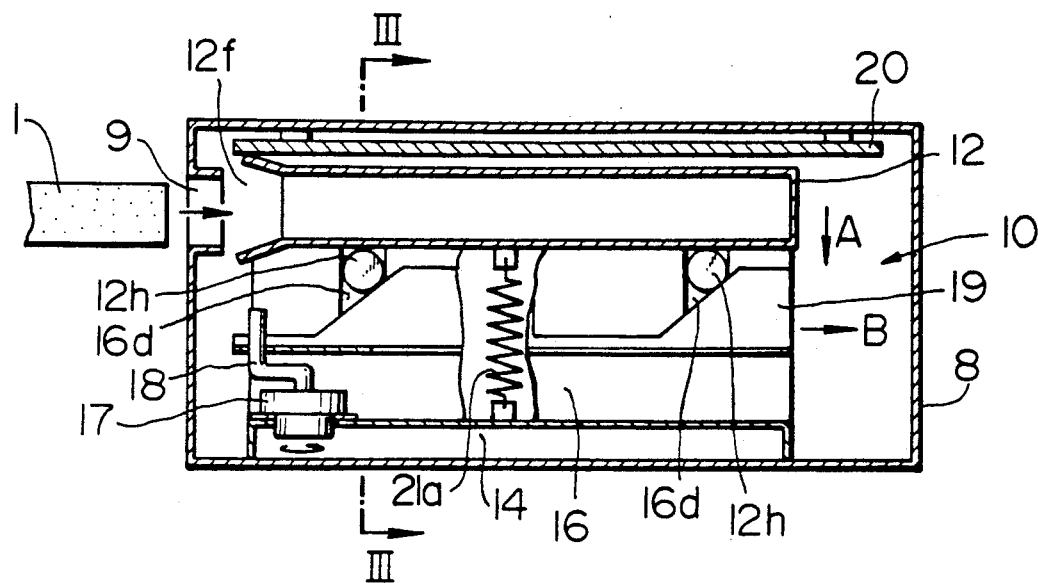
FIG. 1 is a schematic cross-sectional view of an embodiment of the present invention.

A first embodiment of the present invention will be described hereinunder with reference to FIGS. 1 to 4. A recording/reproducing apparatus has a housing 8 which is provided with an opening 9 serving as an entrance and exit for a cartridge 1 accommodating a recording medium and formed in one side of the housing. The recording medium is a disk (not shown) housed in a cassette to form the cartridge 1. The housing 8 accommodates a recording medium loading mechanism which is generally designated by numeral 10. As shown in FIG. 1, the loading mechanism 10 has a recording medium carrier 12 which is moveable within the housing 8 between a loading position aligned with the opening 9 and a recording/reproducing position that is spaced downwardly from the opening 9. A base 14 is fixed to the inner surface of the bottom of the housing 8. A guide member 16 which has a generally U-shaped configuration as viewed in front elevation (FIG. 3) is fixed to the upper surface of the base 14. The guide member 16 has a pair of side walls 16a and a bottom wall 16b which interconnects one end of one of the side walls 16a to the adjacent end of the other side-wall. A motor 17 is secured to the upper side of the bottom wall 16b. The lower half part of the motor 17 extends into the space in the base 14 through a window 16c formed in the bottom wall 16b and a similar window (not shown) provided in the upper wall of the base 14.

The motor 17 is disposed in such a manner that the axis of the output shaft thereof extends vertically, the output shaft being connected to the lower end of a crank pin 18. The upper end of the crank pin 18 extends upwards in an eccentric relationship to the output shaft of the motor 17.

The guide member 16 extends in parallel with the recording medium carrier 12 and horizontally movably receives a reciprocating member 19 of a configuration similar to that of the guide member 16. Thus, the member 19 has a pair of parallel side walls 19a and an intermediate portion 19b which interconnects one ends of these side walls 19a and 19a. The side walls 19a of the member 19 are held in sliding contact with the side walls 16a of the guide member 16 so that the reciprocating member 19 is movable horizontally along the guide member side walls 16a. An elongated slot 19c is formed in the intermediate portion 19c of the member 19 and has a longitudinal axis which extends substantially perpendicularly to the side walls 19a. The elongated slot 19c and the upper end of the crank pin 19 engage with each other in such a manner as to provide a lost motion. When the crank pin 18 is rotated by the output shaft of the motor 17, the reciprocating member 19 is reciprocatingly moved along the side walls 16a of the guide member 16.

Figure 4:
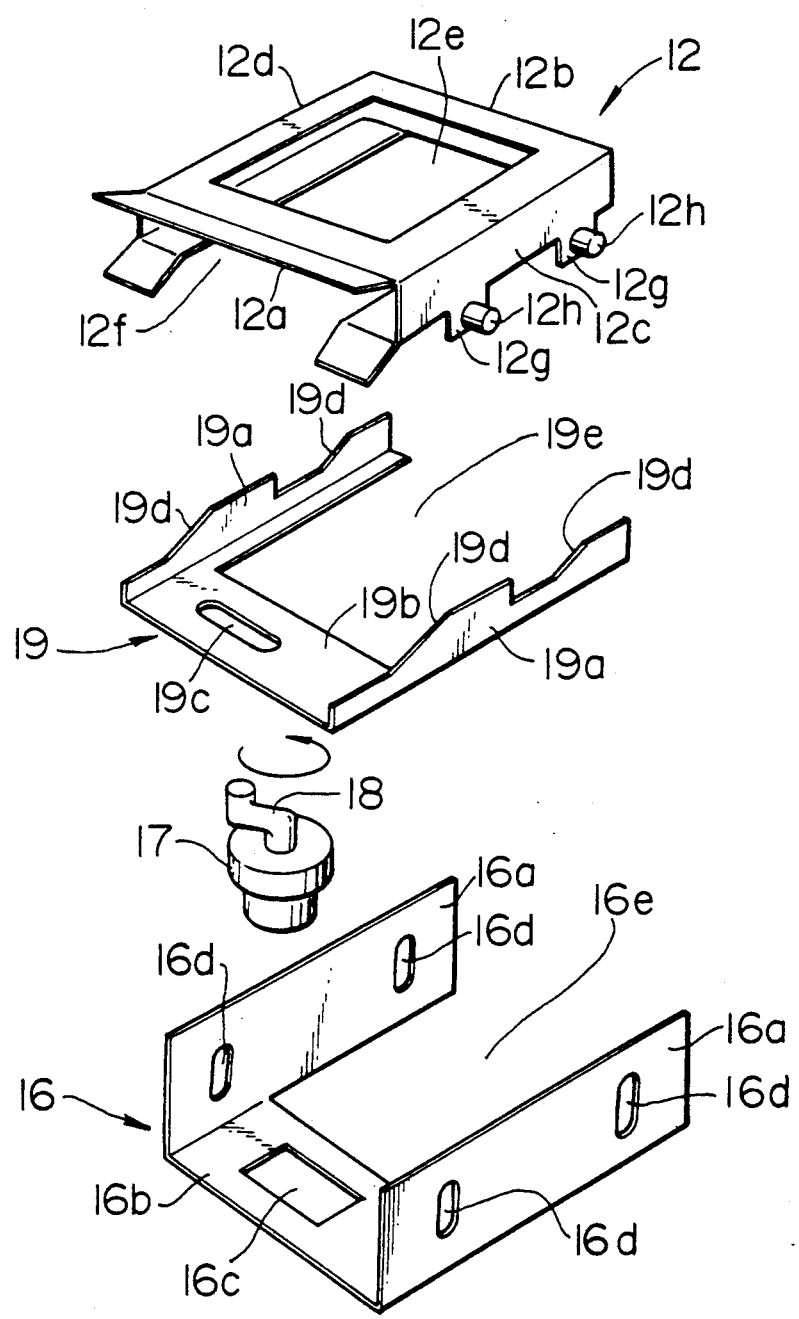
FIG. 4 is an exploded perspective view illustrating various structural elements in their disassembled positions.

Referring to FIG. 4, the recording medium carrier 12 has a substantially quadrilateral configuration having a first side 12a adjacent to the opening 9 of the housing 8, a second side 12b opposite to the side 12a, and third and fourth sides 12c and 12d which extend between the first and second sides 12a and 12b. The carrier 12 has a central window 12e. The first side 12a is provided with an entrance 12f which communicates with the window 12e. The carrier 12 is so sized that the third side 12c and the fourth side 12d are received between and moveable in sliding contact with both side walls 19a and 19a of the reciprocating member 19. Each side wall 19a of the reciprocating member 19 is provided with two spaced apart slanted cam surfaces 19d inclined relative to the direction of the reciprocating motion of the member 19. Pins 12h are secured through brackets 12g to the lower edges of the third and fourth sides 12c and 12d and project horizontally therefrom. The pins 12h of the recording medium carrier 12 engage with the reciprocating member 19 adjacent to the slanted cam surfaces 19d and extend horizontally outwardly beyond these cam surfaces. Vertical guide slots 16d for receiving the outer ends of the pins 12h are formed in the side walls 16a of the guide member 16.

The guide member 16 and the reciprocating member 19 are also of substantially U-shaped configuration as viewed in plan, defining therein spaces 16e and 19e vertically aligned with the window 12e in the recording medium carrier 12.

The carrier 12 is resiliently biased downwards by means of tension springs 21a and 21b which extend between the carrier 12 and the top wall of the base 14.

A circuit board 20 carrying electric circuits for driving and controlling the motor 17 is secured to the inner surface of the top wall of the housing 8 so as to extend horizontally above the recording medium carrier 12.

In operation, when the recording medium carrier 12 is in the loading position shown in FIG. 1, the entrance 12f in the carrier 12 is disposed adjacent to and in alignment with the opening 9 in the housing 8. It is therefore possible to insert or eject the cartridge 1 into and out of the carrier 12 through the opening 9 in the housing 8. When the carrier 12 is in the position shown in FIG. 1, the pins 12h of the carrier 12 engage the portions of the reciprocating members 19 near the upper ends of the slanted cam surfaces 19d. When the cartridge 1 is inserted into the carrier 12 from the exterior of the housing 8, a sensor (not shown) detects the cartridge 1 as having been fully inserted into the carrier 12. Upon receipt of the detection signal, the electric circuit carried by the circuit board 20 operates to drive the motor 17. When the motor starts to operate, the eccentric crank pin 18 engaging with the elongated slot 19c in the reciprocating member 19 causes the reciprocating member 19 to move in the direction of the arrow B in FIG. 1.

Figure 2:
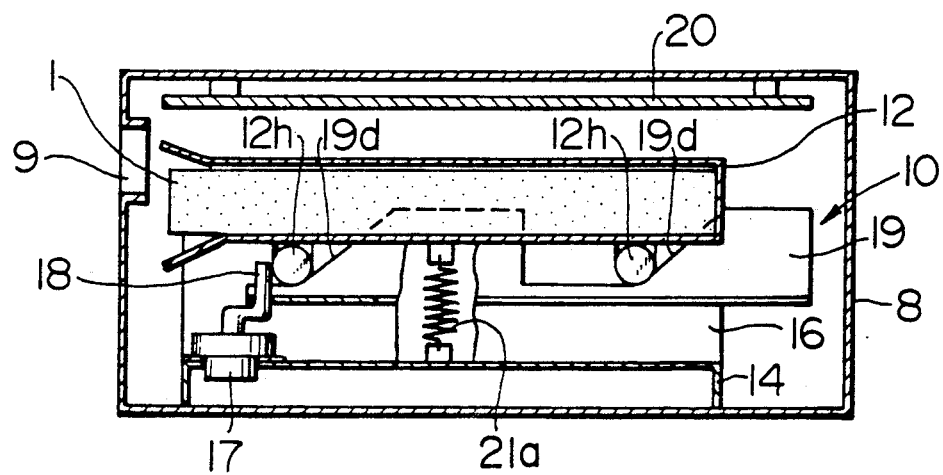
FIG. 2 is similar to FIG. 1, but illustrates a recording medium carrier in a recording/reproducing position.
Figure 3:
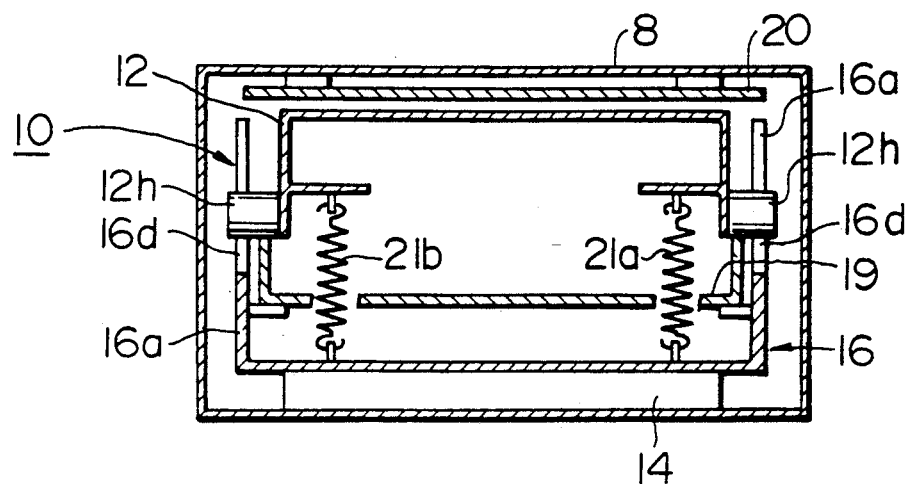
FIG. 3 is a sectional view taken along the line III—III in FIG. 1.

Consequently, the pins 12h provided on the carrier 12 are moved along the guide slots 16d in the guide member 16 by the forces of the springs 21a and 21b in the direction of the arrow A and, accordingly, the carrier 12 moves in the direction of the arrow A to set a disk in the cartridge 1 in the recording/reproducing position shown in FIG. 2.

The completion of the setting of the cartridge 1 in the recording/reproducing position is detected by a sensor (not shown), so that the driving motor 17 stops to operate, and the recording/reproducing apparatus operates its recording/reproducing mechanism (not shown) for a recording or reproduction of a signal in the disc of the cartridge 1.

The loading of the cartridge 1 is thus completed. An unloading operation is carried out as follows:

The rotation of the disk is stopped in response to a command from a commanding system when the recording or reproduction is finished in the position shown in FIG. 2. Upon detection of the stoppage of the rotation of the disk, the circuit carried by the driving circuit board 20 operates to drive the driving motor 17. The direction of rotation of the driving motor 17 is the same as that in the loading operation. As the driving motor 17 rotates, the reciprocating member 19 driven by the crank pin 18 moves in the direction counter to the arrow B, i.e., in the direction reverse to that in the loading operation. In consequence, the pins 12h on the carrier 12 are lifted by the cam surfaces 19d against the forces of the springs 21a and 21b and are moved along the guide slots 16d in the guide member 16 in the direction opposite to the arrow A in FIG. 1, thereby to cause the carrier 12 to move in the direction counter to the arrow A. When a sensor (not shown) senses the arrival of the carrier 12 at the ejecting position which is the same as the cartridge loading position, the driving motor 17 is stopped, so that the cartridge 1 is ready for ejection. As described above, the pins 12h are driven by the cam surfaces 19d, thus serving as cam followers.

Figure 5:
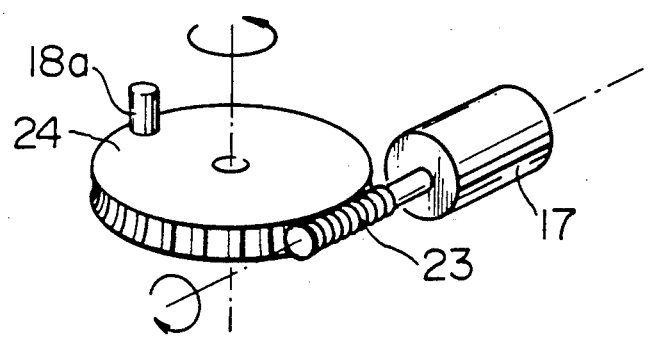
FIG. 5 is a perspective view of a modified driving mechanism.

In the described embodiment, the reciprocating member 19 is driven by means of the crank pin 18 which is connected to the output shaft of the driving motor 17. This arrangement, however, is only illustrative. In another embodiment shown in FIG. 5, a worm 23 is connected to the output shaft of the driving motor 17 and a worm wheel 24 engages with worm 23. A crank pin 18a is secured to one end surface of the worm wheel 24. In this embodiment, the motor 17 is disposed such that its axis extends horizontally, i.e., in parallel with the bottom of the housing 8, so that the housing 8 can be designed to have a reduced height. The use of the worm 23 and the worm wheel 24 makes it possible to obtain a necessary driving torque even from a motor of a smaller capacity.

In the embodiment described hereinbefore, the guide slots 16d have linear configurations to guide the carrier 12 linearly and vertically. This arrangement, however, may be modified and the shapes of the guide slots 16d can be determined freely in accordance with the positional relationship between the loading/ejecting position and the recording/reproducing position of the cartridge 1. It is possible to design such that the guide slots 16 have arcuate configurations so as to enable the carrier 12 to move two-dimensionally such that the movement of the carrier 12 has horizontal and vertical components.

The connection between the crank pin 18 and the reciprocating member 19 is not limited to the use of the elongated slot 19c. For instance, the arrangement may be such that the reciprocating member 9 is biased in only one direction by means of, for example, return spring while the force produced by the crank pin 18 acts only in the opposite direction.

It is also to be understood that, although the disk as the recording medium is housed in the cartridge 1 in the described embodiment, the arrangement may be modified in such a manner that the carrier 12 is used as a disk support and the disk is directly inserted into the carrier 12. In this case, the disk support 12 instead of the cartridge 1 supports the disk and is reciprocatingly moved between the loading position and the recording position.

As will be understood from the foregoing description, according to the present invention, it is possible to obtain a simple recording medium loading mechanism which is operable by a uni-directional operation of the driving motor to carry out loading and unloading of a recording medium. This advantage of the invention is not impaired even when the driving motor 17 is reversed for the purpose of, for example, an error recovery.

Since the loading and unloading are effected by the operation of the driving motor in the same direction, it is possible to simplify the construction of the driving and control circuit for the motor and also the construction of the mechanism for transmitting the torque of the motor to the carrier, thereby to reduce the size and cost and to improve the reliability of the recording medium loading device.

What is claimed is:

1. In a recording medium loading mechanism for use in a signal processing apparatus having a housing with an opening serving as an entrance and exit for a recording medium housed in a cassette, said mechanism being of a type that has:

a recording medium carrier mounted in said housing for movement in a direction substantially perpendicular to the direction in which a recording medium is inserted into and removed from said carrier between a first position for loading adjacent to said opening and a second position for at least one of recording and reproduction that is spaced from said opening;

a motor secured to said housing and having an output shaft which is rotated in response to insertion of a recording medium fully into said carrier to move said carrier from the first position to the second position;

power transmission means for converting the rotation of said motor output shaft into reciprocating movement and transmitting the reciprocating movement to said carrier, said power transmission means including a crank pin driven by the output shaft of said motor to rotate about a first axis, a reciprocating member, driving connection means for converting the rotary motion of said crank pin into a reciprocating movement of said reciprocating member, and motion transmission means for transmitting the reciprocating movement of said reciprocating member to said carrier;

said reciprocating member being disposed in a plane substantially parallel to said carrier and being reciprocatingly movable in directions parallel to said plane, said carrier being arranged to move toward and away from said reciprocating member, said motion transmission means including cam means, said cam means including at least one cam surface provided on one of said reciprocating member and said carrier, and a cam follower provided on the other of said reciprocating member and said carrier and being adapted to cooperate with said cam surface;

the improvement characterized in that said crank pin extends in an eccentric relationship to said first axis and moves along a circle about said first axis, said driving connection means includes an elongated slot formed in said reciprocating member that is engaged with said crank pin to provide a lost motion connection, said elongated slot has a longitudinal axis extending substantially perpendicular to the directions of the reciprocating movement of said reciprocating member, and said motor is of a uni-directionally operative type.

2. A recording medium loading mechanism according to claim 1, wherein said motor is disposed such that the axis of the output shaft thereof is coincident with said first axis, and said crank pin is directly coupled to said output shaft of said motor.

3. A recording medium loading mechanism according to clam 1, wherein said motor is disposed such that the axis of the output shaft of said motor is positioned in a plane substantially perpendicular to said first axis, and wherein said power transmission means further includes a worm wheel rotatable about said first axis and a worm connected to the output shaft of said motor and engaged with said worm wheel, said crank pin being secured to one end surface of said worm wheel.

4. A recording medium loading mechanism according to claim 1, wherein said carrier has a substantially quadrilateral configuration having a first side adjacent to said opening in said housing, a second side opposing said first side, and third and fourth sides which interconnect said first side and said second side, and wherein said reciprocating member has first and second side walls disposed adjacent to and extending in parallel with said third and fourth sides of said carrier and an intermediate portion interconnecting said first and second side walls, each of said first and second side walls having at least one inclined cam surface, said carrier being provided at each of the third and fourth sides thereof with a cam follower cooperable with said cam surface, said cam followers extending laterally from said third and fourth sides of said carrier to engage with said cam surfaces.

5. A recording medium loading mechanism according to claim 4, wherein said reciprocating member is reciprocatably received in a guide member fixed to said housing, said guide member having third and fourth side walls which extend in parallel with said first and second side walls of said reciprocating member, respectively, said third and fourth side walls being formed therein with guide slots engaged with said cam followers to guide said carrier during reciprocating movements thereof.

6. A recording medium loading mechanism according to claim 1, wherein said motor is stopped when a setting of said recording medium in said second position is completed, said recording medium being driven in said second position for a desired recording or reproduction, and said motor being again rotated when the desired recording or reproduction is finished to move said carrier from said second position to said first position, and said motor is stopped when said carrier is returned to said first position.

7. In a loading mechanism for a cartridge accommodating a recording medium, said mechanism being of the type that has:
   a carrier with an opening for insertion of said cartridge and movable in opposite first directions substantially perpendicular to opposite second directions in which said cartridge is inserted into and removed from said carrier, respectively;
   a movable member drivingly connected to said carrier and reciprocally movable in a plane substantially parallel to the second directions in which said cartridge is inserted into and removed from said carrier;
   a motor rotatable in response to insertion of said cartridge fully into said carrier;
   means for transmitting the torque of said motor to said movable member, said torque transmitting means including a crank pin driven by an output shaft of said motor to rotate about a first axis and a driving connection means for converting the rotary motion of said crank pin into a reciprocal movement of said movable member; and
   means for moving said carrier in said first directions between a first position for insertion and removal of said cartridge into and out of said carrier and a second position for at least one of recording and reproduction of a signal into and out of said recording medium, said moving means including motion transmission means for transmitting the reciprocal movement of said movable member to said carrier;
   the improvement characterized in that said crank pin extends in an eccentric relationship to said first axis and moves along a circle about said first axis, said driving connection means includes an elongated slot formed in said movable member that is engaged with said crank pin to provide a lost motion connection, said elongated slot has a longitudinal axis extending substantially perpendicular to the directions of the reciprocating movement of said movable member, and said motor is of a uni-directionally operative type.

8. A cartridge loading mechanism according to claim 7, wherein said moving means include means for always exerting a dynamic force to said carrier in a direction substantially perpendicular to the direction in which said cartridge is inserted into and removed out of said carrier.

9. A cartridge loading mechanism according to claim 8, wherein said dynamic force exerting means comprises at least one spring member always acting on said carrier.

10. A cartridge loading mechanism according to claim 8, wherein said movable member is disposed in a plane substantially parallel to said carrier and is reciprocally movable in directions parallel to said plane, said carrier being arranged to move toward and away from said movable member, said motion transmission means including cam means operative to move said carrier towards said second position against the force of said dynamic force exerting means when said movable member is moved in a direction.

11. A cartridge loading mechanism according to claim 10, wherein said cam means include at least one cam surface provided on one of said movable member and said carrier, and a cam follower provided on the other of said movable member and said carrier to cooperate with said cam surface.

12. A cartridge loading mechanism according to claim 7, wherein said motor is disposed such that the motor output shaft has an axis coincident with said first axis.

13. A cartridge loading mechanism according to claim 7, wherein said motor is disposed such that the motor output shaft has an axis extending in a plane substantially perpendicular to said first axis, and wherein said power transmission means further includes a worm wheel and a worm connected to the motor output shaft and engaged with said worm wheel, said crank pin being mounted on an end face of said worm wheel 14. A cartridge loading mechanism according to claim 7, wherein said uni-directionally operative motor is rotated in response to insertion of said cartridge fully into said carrier and stopped upon completion of said setting of said cartridge in said second position, said recording medium is then driven in said second position for a desired recording or reproduction, said motor is then rotated again when the desired recording or reproduction is finished to move said carrier from said second position to said first position, and said motor is stopped when said carrier is returned to said first position.

15. In a recording medium loading mechanism for use in a signal processing apparatus having a housing with a first opening serving as an entrance and exit for a recording medium housed in a cassette, said mechanism being of the type that has:
   a recording medium carrier having a second opening for insertion of said recording medium and mounted in said housing for movement between a first position for loading adjacent to said first opening and a second position for at least one of recording and reproduction that is spaced from said first opening, said movement being in a first direction substantially perpendicular to a second direction in which a recording medium is inserted into and removed from said carrier;
   a movable member drivingly connected to said carrier and reciprocally movable in a first plane substantially parallel to said second direction;
   a motor rotatable in response to insertion of said recording medium fully into said carrier;
   a crank pin driven by an output shaft of said motor to rotate about a first axis substantially perpendicular to said first plane;
   said carrier having a substantially quadrilateral configuration having a first side adjacent to said first opening in said housing, a second side opposing said first side and third and fourth sides which interconnect said first and second sides, said second opening being formed in said first side;
   said movable member having first and second side walls disposed adjacent to and extending in parallel with said third and fourth sides of said carrier, respectively, and an intermediate portion interconnecting said first and second side walls and extending in a second plane substantially parallel to said first plane;

driving connection means for converting the rotary motion of said crank pin into a reciprocal movement of said movable member;

means for transmitting the reciprocal movement of said movable member to said carrier, said transmitting means including at least one cam surface formed on each of said first and second side walls of said movable member and inclined to said first plane and a pin provided on each of said third and fourth sides of said carrier and operatively engaging with said inclined cam surface;

biasing means acting on said carrier to keep the pins thereon engaged with associated inclined cam surfaces on said movable member; and a guide member fixed to said housing and having first and second side walls disposed adjacent to and extending in parallel with said first and second side walls of said movable member to guide the reciprocal movement thereof, said first and second side walls of said guide member having formed therein guide slots engaged with the pins on said carrier to guide the movement thereof between said first and second positions, the improvement characterized in that said crank pin extends in an eccentric relationship to said first axis and moves along a circle about said first axis, said driving connection means includes an elongated slot formed in said movable member that is engaged with said crank pin to provide a lost motion connection, said elongated slot has a longitudinal axis extending substantially perpendicular to the directions of the reciprocating movement of said movable member, and said motor is of a uni-directionally operative type.

* * * * *